US006816391B2

(12) United States Patent
Davis et al.

(10) Patent No.: US 6,816,391 B2
(45) Date of Patent: Nov. 9, 2004

(54) TOOL-LESS ACCESS COVER AND EMI TIGHT ACCESS DOOR

(75) Inventors: David R. Davis, Jefferson, SD (US); Cesar Daniel Castillo, El Paso, TX (US); Armando Rocha, Canutillo, TX (US); Richard A. Gibson, El Paso, TX (US); Vernon D. Erickson, Dakota Dunes, SD (US); Thomas H. Carson, South Sioux City, NE (US)

(73) Assignee: Gateway, Inc., Irvine, CA (US)

( * ) Notice: Subject to any disclaimer, the term of this patent is extended or adjusted under 35 U.S.C. 154(b) by 3 days.

(21) Appl. No.: 10/040,340

(22) Filed: Nov. 1, 2001

(65) Prior Publication Data

US 2003/0081399 A1 May 1, 2003

(51) Int. Cl.[7] .................................................. H05K 9/00
(52) U.S. Cl. ...................................... 361/818; 361/752
(58) Field of Search .......................... 361/63, 724–727, 361/800, 801, 816, 818, 752–754, 759, 679, 683; 312/223.1–223.3; 403/24, 409.1

(56) References Cited

U.S. PATENT DOCUMENTS

| 4,659,869 A |   | 4/1987  | Busby |
|---|---|---|---|
| 5,191,544 A | * | 3/1993  | Benck et al. ............... 361/688 |
| 5,500,789 A |   | 3/1996  | Miller et al. |
| 5,681,066 A | * | 10/1997 | Anderson .................... 292/33 |
| 5,717,570 A |   | 2/1998  | Kikinis |
| 5,825,626 A | * | 10/1998 | Hulick et al. ............... 361/724 |
| 5,877,938 A | * | 3/1999  | Hobbs et al. ............... 361/724 |
| 5,959,841 A | * | 9/1999  | Allen et al. ................. 361/725 |
| 5,997,115 A |   | 12/1999 | Radloff et al. |
| 6,015,195 A |   | 1/2000  | Anderson et al. |
| 6,061,234 A |   | 5/2000  | Broder et al. |
| 6,109,710 A |   | 8/2000  | Wu et al. |
| 6,157,532 A | * | 12/2000 | Cook et al. ................. 361/681 |
| 6,194,653 B1 | * | 2/2001 | McMiller et al. ...... 174/35 GC |
| 6,373,690 B1 | * | 4/2002 | Buican et al. ............. 361/683 |
| 6,437,980 B1 | * | 8/2002 | Casebolt .................... 361/687 |
| 6,480,398 B1 | * | 11/2002 | Fiora et al. ................. 361/816 |

OTHER PUBLICATIONS

Apple Products Power Mac G4–Expansion Slot Machine—Five Slots offer massive expandability internet search.

* cited by examiner

*Primary Examiner*—David Martin
*Assistant Examiner*—Thanh S. Phan
(74) *Attorney, Agent, or Firm*—Chad Swantz; Suiter-West (57) ABSTRACT

An information handling system case is disclosed which has a chassis suitable for containing an electronic component, an access door removably mounted to the chassis, the access door suitable for permitting access to an electronic component contained in the computer chassis, and a release mechanism adjacent to the access door, wherein the release mechanism is manually operable by a single hand of a user to release the access door from the chassis, the access door separating from the chassis upon manipulation of the release mechanism by the user. The quick release mechanism is preferably a squeezable handle. EMI shielding is accomplished through EMI clips.

17 Claims, 6 Drawing Sheets

TOOL-LESS ACCESS COVER AND EMI TIGHT ACCESS DOOR

FIELD OF THE INVENTION

The present invention generally relates to the field of information handling system housing, and particularly to an EMI shielded computer case having single handed access for opening and removing an access panel door.

BACKGROUND OF THE INVENTION

Modularity is the standard in the manufacture of computers. It is from time to time necessary to troubleshoot or upgrade the hardware of a computer. This requires access to the modular components within the computer case. Sometimes the computers are disposed in places which are hard for the troubleshooter to access. Although access panels have been used in the past, it is still not easy to reach certain computers. Often, the case, such as a tower case, desk-top case, or the like is hidden from view to increase the available work space, such as by hiding the case under a desk or in the corner of a cubicle. Gaining access to these systems may require even more time on the part of the information technology professional.

During the assembly and shipping process, vacuum lifts can damage the computer case if the access panel is not securely mounted to the computer case.

Another concern in the operation of conventional electronic equipment is that it is typically accompanied by the generation of electromagnetic radiation. If not properly shielded, such radiation can cause considerable interference with unrelated equipment. Accordingly, it is necessary to effectively shield and ground all sources of radio frequency and electromagnetic radiation. When the equipment housing is provided with a readily openable access panel or door, effective electromagnetic interference (EMI) shielding presents more of a problem.

EMI gaskets have been used around the access panels or doors. Gaskets have a high cost, are hard to install, can leak at their joints, and have problems of coming off and cracking with age.

Therefore, it would be desirable to provide a computer case having easy access which is securely mounted and offers good EMI protection.

SUMMARY OF THE INVENTION

Accordingly, the present invention is directed to a method for removing and installing an access panel in an information handling system case using a single hand.

In a first aspect of the present invention, an information handling system case is disclosed which has a chassis suitable for containing an electronic component, an access door removably mounted to the chassis, the access door suitable for permitting access to an electronic component contained in the computer chassis, and a release mechanism adjacent to the access door, wherein the release mechanism is manually operable by a single hand of a user to release the access door from the chassis, the access door separating from the chassis upon manipulation of the release mechanism by the user.

The quick release mechanism is in one embodiment a squeezable handle. The use of a single handed release mechanism allows greater facility in gaining access to the components inside the housing of an information handling system.

The locking rod which forms the part of the release mechanism internal to the chassis is generally cylindrical and has two notched portions which retain clips from the access door. The use of two clips helps to spread the force applied to the access door. The locking rod also has two ramp portions in the two notched portions to pop the access door slightly ajar upon opening. This facilitates door removal.

In a second aspect of the present invention, a method is disclosed for accessing the inside of a computer case having an access panel door, comprising the step of opening the access panel door in a latched state by squeezing a handle.

In a third aspect of the present invention, an access panel door for a computer is disclosed which includes a support body which extends so as to cover an opening in a computer chassis and a single long flange on each side of the door that mates with a corresponding EMI clip or pair of EMI clips on the computer chassis in which EMI sealing is done on an outer lip or rim of the side of the computer chassis to which the access panel door is mounted.

This method of EMI sealing offers a complete seal, lower cost, and easy snap-on assembly.

The hinging hooks of the access panel door are designed to facilitate placement and removal.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 10, exemplary embodiments of the present invention are shown.

This invention is for a quick release, tool-less access door on a computer case. Information handling systems having housings suitable for removable mounting of system components are known. The information handling system may be connected to a display device to enable a user to perform a variety of functions, such as word processing, spread sheets, presentation generation, or the like. The information handling system may also utilize a wide variety of components and peripheral devices to provide functionality, such as a printed circuit board, a floppy disk, hard disk, optical disk, laser disk, compact disk read-only memory (CD-ROM), digital versatile disk read-only memory (DVD-ROM), digital versatile disk random-access memory (DVD-RAM), or the like.

Additionally, the information handling system may also utilize a wide variety of components including input/output devices to provide additional functionality. Exemplary devices include a mouse, joystick, trackball, trackpad, trackstick, infrared transducers, printer, modem, RF modem, bar code reader, charge-coupled device (CCD) reader, scanner, compact disk (CD), compact disk read-only memory (CD-ROM), digital versatile disk (DVD), video capture device, touch screen, stylus, electroacoustic transducer, microphone, speaker, or the like. Exemplary uses of the invention by an information technologies professional are for descriptive purposes only. The use of these terms is meant in no way to limit the scope of the present invention, the terms being used to merely facilitate discussion of the invention. It should be apparent that the information handling system of the present invention may be utilized in a variety of ways contemplated by a person of ordinary skill in the art.

Figure 1:
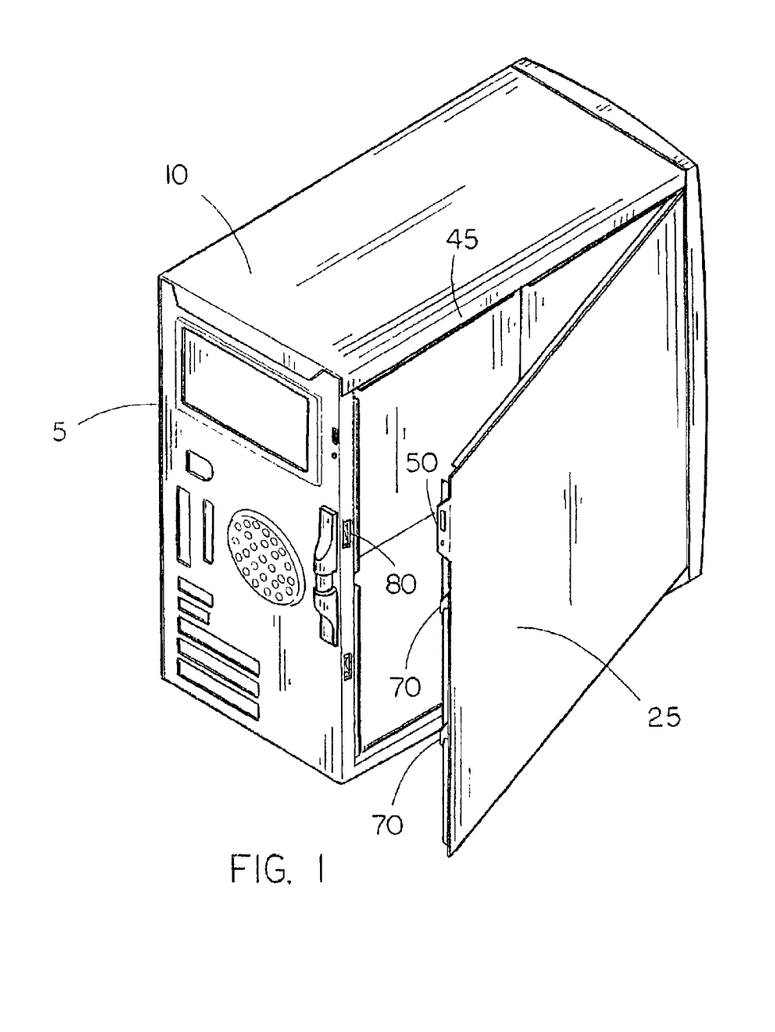
FIG. 1 illustrates a perspective view of the invention.

FIG. 1 shows a perspective view of an information handling system housing 5 which includes a computer chassis 10 with a squeezable panel access handle 30. The single-hand squeezable handle 30 in one embodiment is located midway along the height of the computer chassis 10 and near to the edge of one side where the removable panel 25 is placed. A rim 45 is formed inward on the case 10 to support the mounting of the removable panel 25. Openings 80 are provided in the rim on one of its sides so that clips 70 from the panel may pass by and be engaged by the latching element controlled by the squeezable handle 30. The two clips or hooks 70 are spread out to give a wider holding area, so that it will withstand being lifted by a "vacuum lift" when attached to the door. Flanges 60 from the access panel 20 are retentively engaged by the EMI clips 40 found along the edges of the rim 45. A tab 50 formed near a flange 60 on the panel 20 permits a backup thumb screw attachment for shipping. Other possible means of attaching the tab 50 to the chassis 10 include riveting, welding, and soldering.

Figure 2:
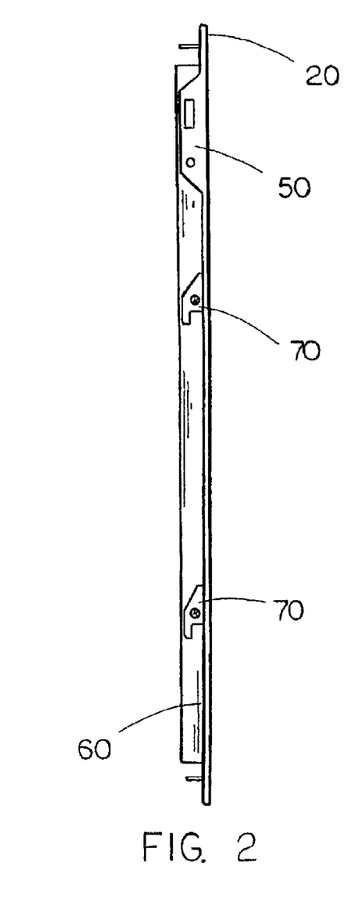
FIG. 2 illustrates a side view of the access door show the clips and supplemental mounting tab.

FIG. 2 shows a side view of the access panel door 25. The clips or hooks 70 are distributed around the middle of the flange 60 which projects from panel body 20.

Figure 3:
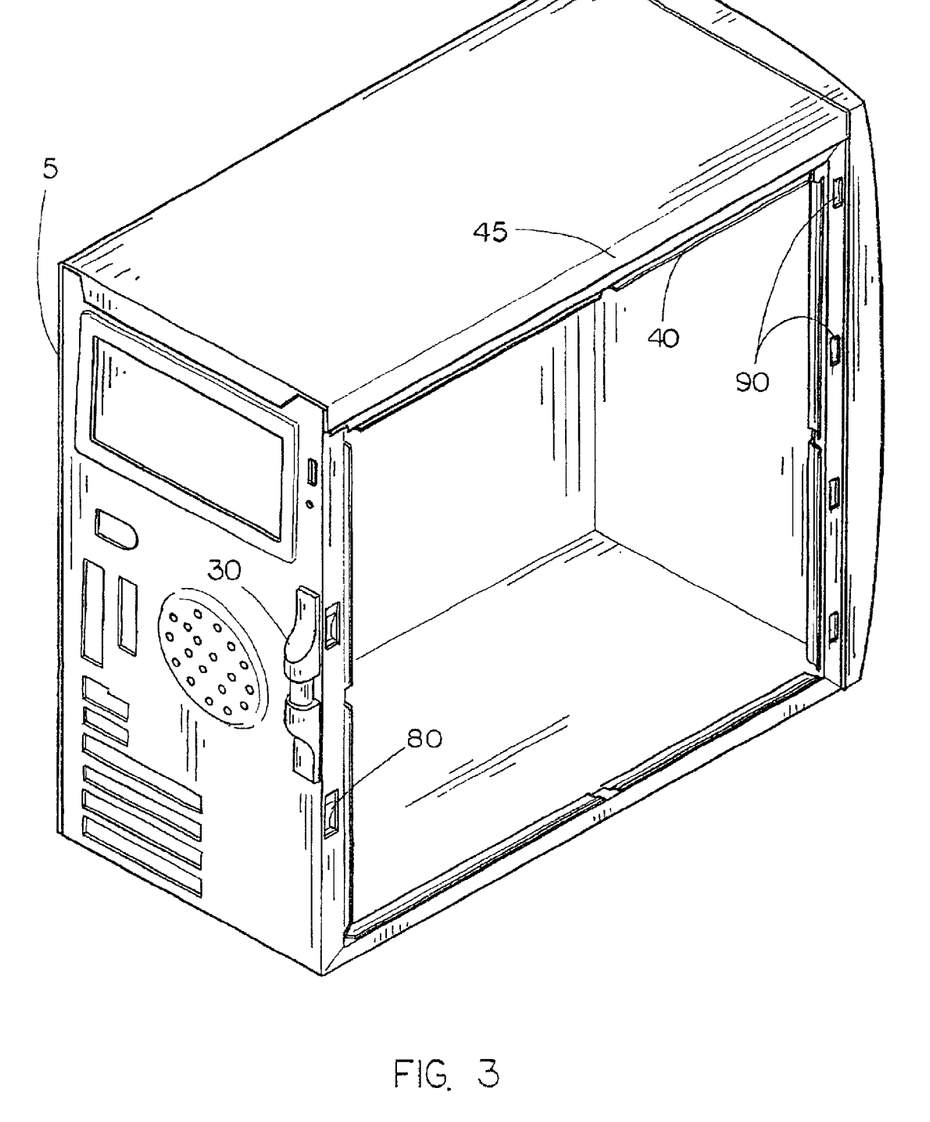
FIG. 3 illustrates a computer case with an access panel removed.

FIG. 3 shows the case with the panel 25 removed. Slots 90 are formed on the rim 45 opposite to the openings 80. This permits hinging hooks or pins to be inserted for supporting the panel 25 during removal or attachment.

Figures 4, 5:
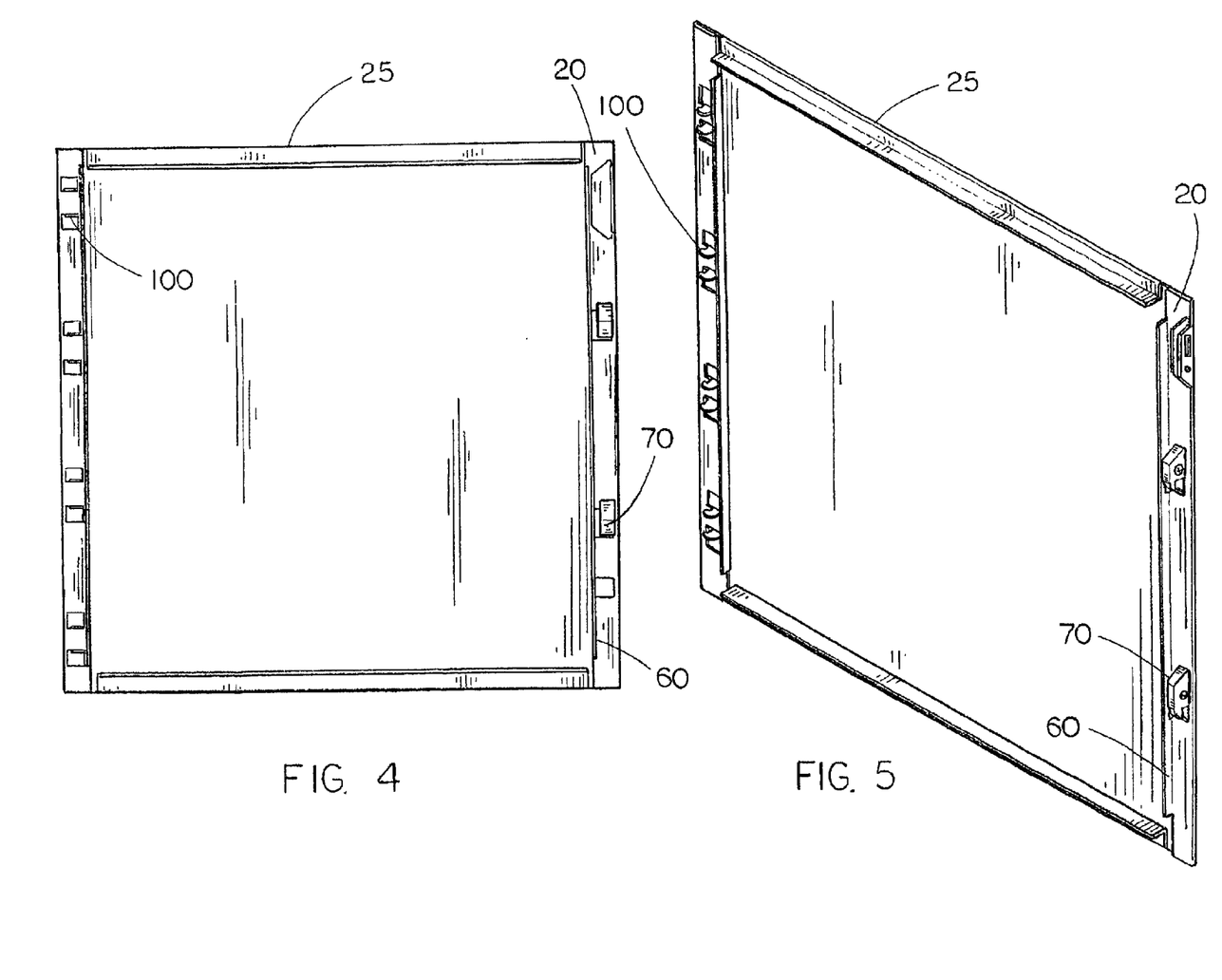
FIG. 4 illustrates the side of the access panel for mating with the case.
FIG. 5 illustrates a perspective view of the access door showing the clips, hinging hooks, flanges, and mounting tab.

FIG. 4 shows the side of the access panel door 25 which mates with the case 10. Hinging pins or hooks 100 are distributed along one side of the panel 25. Spaced at an appropriate distance from the outer edges of the panel 25 are the flanges 60. The flanges 60 may project generally vertically from the panel surface 20. To provide EMI shielding, the panel is made of a conductive material. By extending a single flange almost entirely along each side of the access panel door, better EMI shielding is attained as there are fewer breaks or gaps in the resulting enclosure.

FIG. 5 shows a perspective view of the access panel door 25. The hinging hooks 100 may preferably be flat plates of metal machined from an edge support layer and bent. They may also be mounted by welding, riveting, bolting, screwing, and the like. In the preferred embodiment, there are four pairs of hinging hooks, each pair fitting into one slot 90 of the computer chassis 10.

Figure 6:
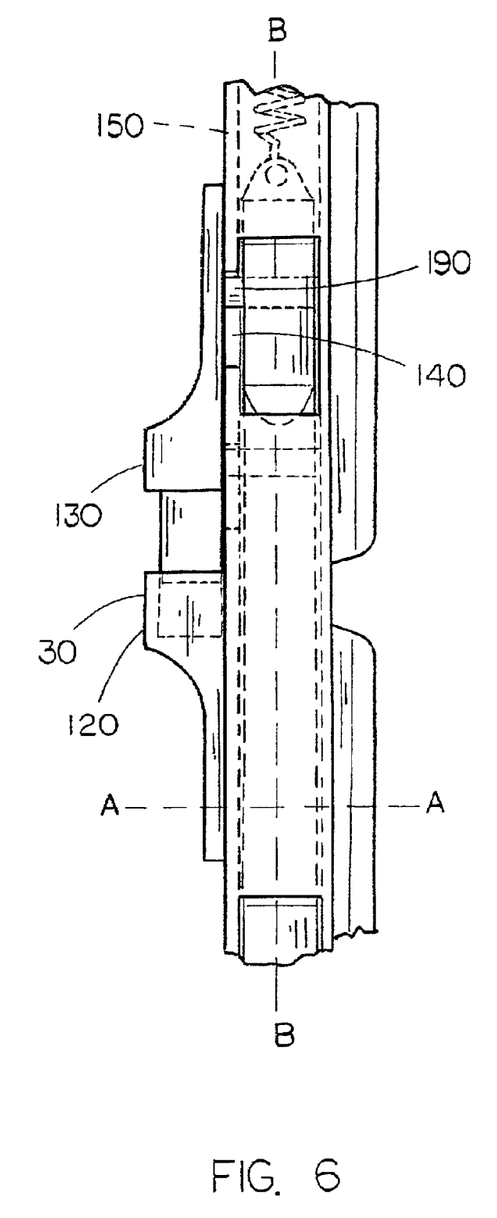
FIG. 6 illustrates the squeezable handle and release mechanism of the present invention in a normal position.

FIG. 6 shows the squeezable handle 30 in a normal, ungripped position. A fixed support body 120 is mounted on the case's metal frame 150. In the frame 150 is formed an opening 140 for travel of an engaging member 160. The engaging member 160 engages the latches or hooks 70 from the panel. The engaging member 160 preferably acts as a unitary structure with the movable portion 130 of the handle 30 and travels with the movable portion 130 of the handle 30. The movable portion 130 and the engaging member 160 may travel within the opening 140. The movable portion 130 has three differently sized sections along its longitudinal axis which also generally coincides with the longitudinal axis of the support body 120. The section of the movable portion 130 proximal to the support body 120 may be rod shaped. The proximal section moves within and is guided through a hollowed out portion of the support body 120. The middle section of the movable portion 130 acts as a stop against the support body 120 when the handle is squeezed. The greater contact area better distributes the force applied to the handle components, reducing breakage. The distal section of the movable portion 130 provides support for the handle 30.

A spring may be employed with the engaging member 160 to keep the movable portion 130 extended from the support body 120 at a maximal distance when the handle is in a normal, ungripped position. The spring may be implemented to pull on the engaging member 160 or to push the movable portion 130 away from the support body 120. The engaging member in the normal position latches the latches or hooks 70 of the panel 25. In addition, for guiding the moving elements, a rail formed from the chassis may be placed to guide the movement of the engaging member.

Figure 7:
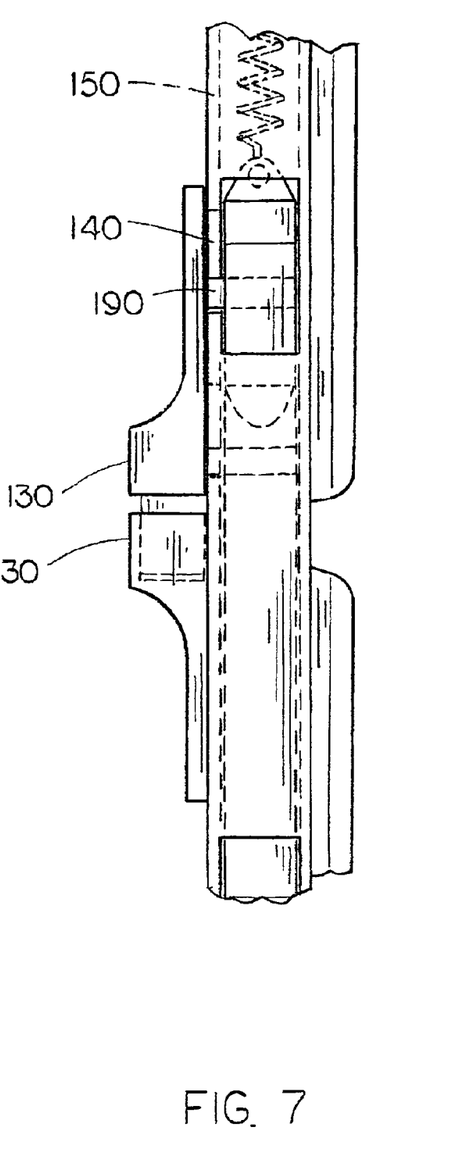
FIG. 7 illustrates the handle and release mechanism in a squeezed position.

FIG. 7 shows the handle 30 in a squeezed position.

Figure 8:
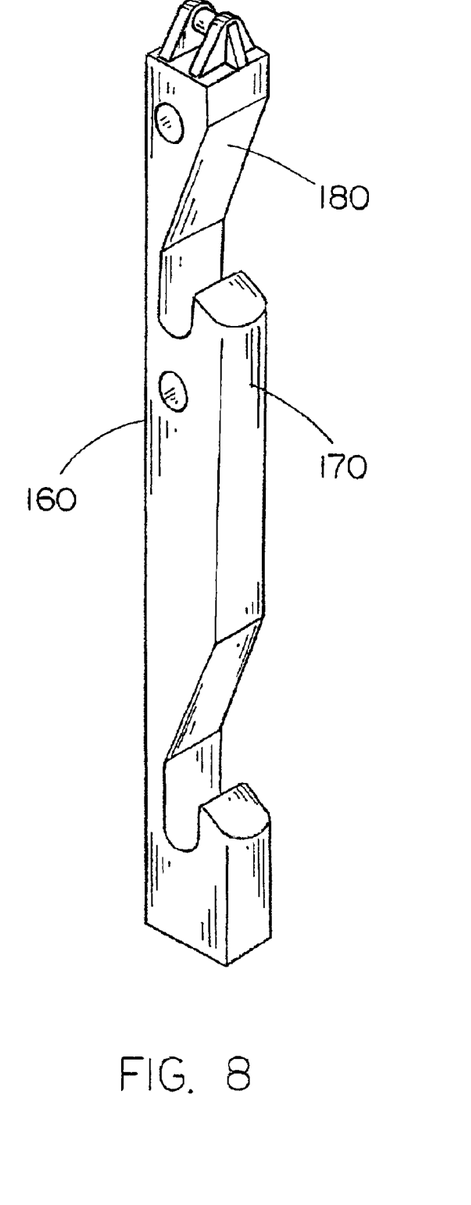
FIG. 8 illustrates the latching rod of the quick release mechanism.

FIG. 8 shows a view of the engaging member 160 along the cut line B—B. The engaging member may be a generally cylindrical rod in which hooks 170 are formed by molding or removal of material. A ramp 180 of the rod facilitates release of the hooks or latches 70 from access panel door 25 so as to impart a spring like release to partially open the access door when the handle is squeezed. The engaging member 160 and the moveable portion 130 may be removably attached by pins 190. The engaging member may be made of a self-lubricating material such as nylon or another plastic. Metal engaging members may also be used.

Other mechanisms for correlating the movement of the movable portion 130 of the handle 30 with respect to the engaging member 160 may be employed as long as they permit engagement with and disengagement from the latches or hooks 70 or other latchable elements from the panel.

The squeezable handle 30 may be contoured so as to be better grippable by an information technologies professional or other user who is to troubleshoot or otherwise access the computer. In one embodiment, small ridges are distributed along the finger contact areas. The squeezable handle 30 may also be abraded or coated so as to enhance grippability.

Travel of the moveable portion 130 and the engaging member 160 is stopped by either or both of the movable portion 130 against fixed support body 120 and the engaging member 160 against the edge of the opening 140.

Figure 9:
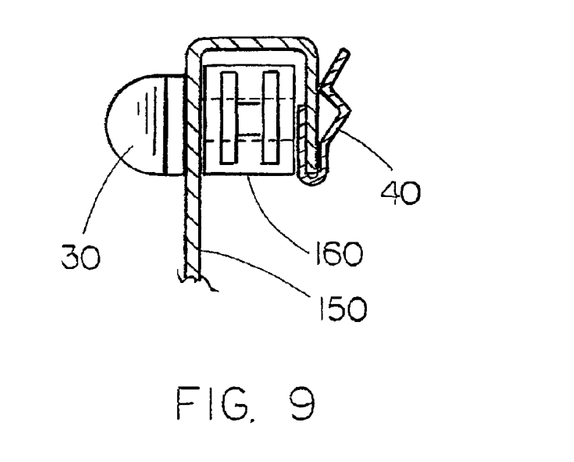
FIG. 9 illustrates a cut away view of the quick release mechanism mounted to the computer chassis.

FIG. 9 shows a cross sectional view of the quick release mechanism along cut line A—A of FIG. 5. Part of the chassis 150 is bent to form a channel for the engaging member 160 to travel along. The engaging member 160 is attached to the movable portion 130 of handle 30 through one, two, or more slots made in the chassis to allow the physical connection and travel of the two parts.

Figure 10:
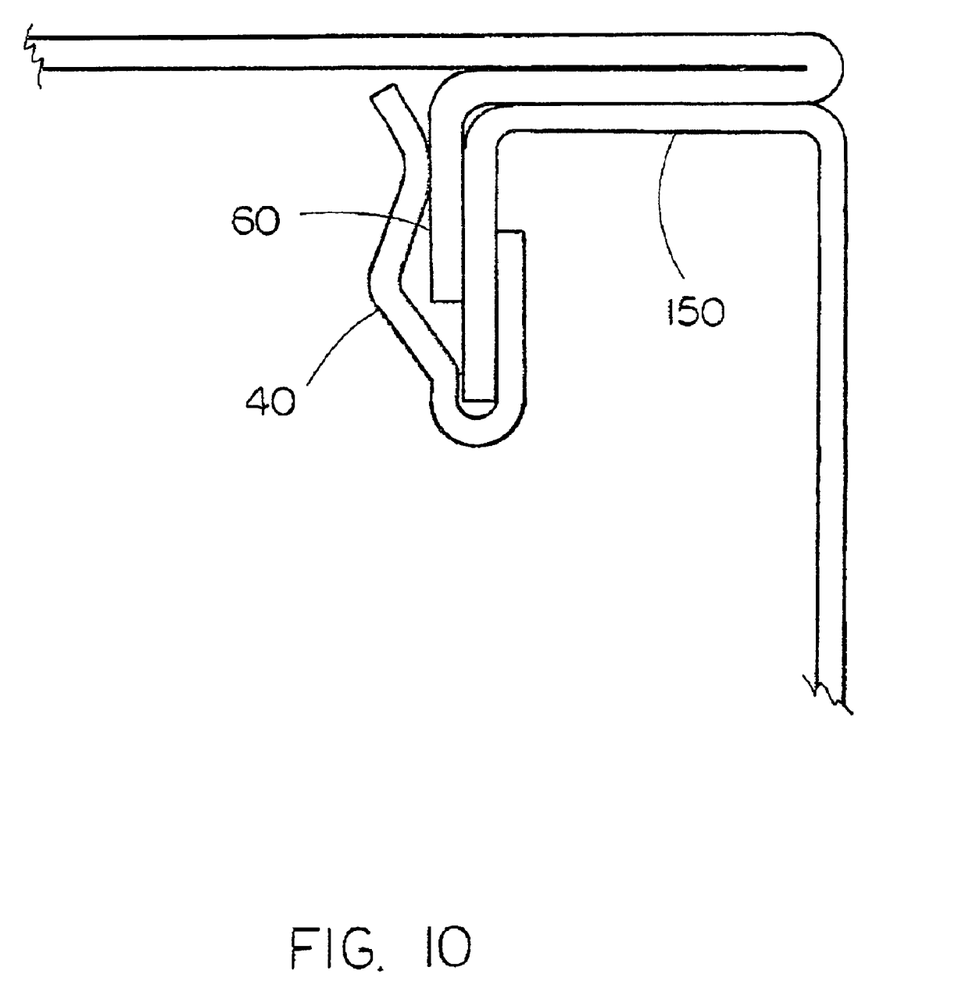
FIG. 10 illustrates a cutaway view of a flange of the access panel engaging an EMI clip.

FIG. 10 shows an embodiment in which the flange 60 is retained in an EMI clip 40. The door has metal or otherwise conductive flanges 60 on all sides that assemble into the EMI clips 40 that are attached to the inside of the computer case. In a preferred embodiment, there are eight EMI clips 40 on the case, two on each of the four sides. A detent of the clip goes into an opening in the case for superior retention. The EMI clips 40 are generally U-shaped, but may have other shapes. One aspect of the shape of the EMI clips 40 is that it securely retains the flange while providing adequate EMI protection and readily release the flange when the access panel door is in the process of being removed. The door flanges rest in the U-shaped cavities of the clips to establish a fully contained EMI sealing. The EMI clips 40 are preferably made from steel with some resiliency or spring so as to open them to permit entry and retention of the flanges of the door.

In operation, squeezing the single squeeze handle 30 releases the door by releasing two latches or hooks 70 inside the computer chassis 10. Referring again to FIGS. 6 and 7, when the handle is squeezed, the movable portion of the handle 130 moves down to the fixed support body 120. In doing so, the engaging member 160 affixed to the movable handle portion 130 disengages from the latches or hooks 70. The actuation of the squeeze handle unlocks and slightly opens the panel 20. This slight opening may be achieved by a ramp structure within the engaging member 160 of the quick release mechanism 30, may also be due to a mild spring action in the construction of the panel 25, and the like.

With the squeeze handle design, the access door may be removed from the front door of the case by reaching around the side of the case, squeezing the release handle, pivoting the door open, and removing the door. The door can be reattached to the case in a similar manner, but in a reverse order. The design enables an information systems technology professional or other user to access components within the housing of the information handling system.

It is believed that the tool-less access cover and EMI tight access door of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof It is the intention of the following claims to encompass and include such changes.

What is claimed is:

1. A computer case, comprising:
    an access panel door, the access panel door comprising
        a support body which extends so as to cover an opening in a computer chassis, has a perimeter, and has four sides; and
        flanges spaced inward from the perimeter and extending from a major surface of the support body; and
    a chassis with an opening on one side for mounting the access panel door, the chassis having a handle with a stationary part and a movable part in which the access panel door is opened when the stationary part and the movable part of the handle are squeezed together, the chassis having EMI clips surrounding the opening, the EMI clips retentively receiving the flanges of the access panel door,
    wherein each flange substantially extends along length of its corresponding side and each of the sides of the support body has only one flange,
    wherein one side of the access panel door has latches for engaging an engaging member of a locking mechanism in the computer chassis, the latches being located outside the area bound by the flanges,
    wherein hinging elements are formed on the access door on the side of the access panel door opposite to the side which has the latches and wherein the latches are spread out to give a wider holding area so that the computer case may be lifted by a vacuum lift attachable to the access panel door,
    wherein a tab projects at the perimeter of the side of the access panel door that has latches, the tab having at least one perforation to provide for further securing the access panel door to the computer chassis.

2. The computer case of claim 1, wherein the computer chassis further comprises slots for accepting the hinging elements of the access panel door.

3. The computer case of claim 2, further comprising a rim formed inward around the opening of the chassis of the computer case.

4. The computer case of claim 3, wherein the EMI clips are retentively held by the rim along the edges of the opening.

5. The computer case of claim 4, wherein the EMI clips are generally U-shaped.

6. The computer case of claim 5, wherein there are four EMI clips per chassis.

7. The computer case of claim 5, wherein there are eight EMI clips per chassis.

8. The computer case of claim 5, wherein a backup thumb screw is used to further attach the access panel door to the computer case.

9. The computer case of claim 1, wherein the EMI clips occupy substantially all of a perimeter around the opening.

10. The computer case of claim 1, wherein at least one of the EMI clips is proximate to the engaging member and the engaging member is proximate to the handle.

11. The computer case of claim 10, wherein the engaging member has two notches to retain the latches.

12. The computer case of claim 1, wherein the engaging member is formed of a self lubricating material.

13. The computer case of claim 1, wherein the handle is contoured.

14. A method for accessing the inside of a computer case having an access panel door and a chassis, comprising the step of:
    opening the access panel door in a latched state by squeezing a handle, wherein the access panel door opens slightly when the handle is squeezed; and
    removing the panel door from the computer chassis by a pulling action on the opened access panel door, the pulling action includes removing hinging members that are part of the access panel door from the retentive elements in the computer chassis, wherein the hinging members are pairs of hooks, each pair of hooks corresponding to one retentive element of the computer chassis and the squeezing the handle involves moving a movable portion of a handle toward a stationary portion of the handle and wherein the handle is part of the computer chassis and not part of the access panel door.

15. The method of claim 14, wherein the access panel door is opened and removed by a single hand.

16. An information handling system case, comprising:

a chassis suitable for containing an electronic component;

an access door removably mounted to the chassis, the access door suitable for permitting access to an electronic component contained in the computer chassis; and a release mechanism adjacent to the access door, wherein the release mechanism is manually operable by a single hand of a user to release the access door from the chassis, the access door separating from the chassis upon manipulation of the release mechanism by the user, the chassis including a U-shaped clip, the access door including a flange made of a conductive material, wherein the conductive flange engages the U-shaped clip when the access door is installed on the chassis, the access door has hinging pins that fit within slots on the chassis so as to provide the access door rotational movement about an axis defined by the mating of the hinging pins and the slots, the chassis including a single handedly operational squeezable handle that causes engagement of a locking mechanism of the chassis with a latch of the access door, wherein the access door is further secured to the chassis by means of a back up screw attachment, wherein a tab is secured to an outer edge of the access door, wherein the tab is mounted on a side of the chassis that has the release mechanism, the tab being secured to the chassis through a thumb screw.

17. A computer case, comprising:

a computer chassis with an opening on one side;

an access panel door which covers the opening and attaches to the computer chassis; and means for removing the access panel door from the computer chassis using a single hand of a user, wherein the means for removing includes a handle with a stationary part and a movable part in which the access panel door is opened when the stationary part and the movable part of the handle are squeezed together, the movable part moving toward the stationary part when squeezed together.

* * * * *